US008839924B2

(12) United States Patent
Takikawa et al.

(10) Patent No.: US 8,839,924 B2
(45) Date of Patent: Sep. 23, 2014

(54) FLUID TRANSMISSION APPARATUS

(75) Inventors: Yoshihiro Takikawa, Tsushima (JP);
Kazuto Maruyama, Nishio (JP);
Kazuhiro Itou, Anjo (JP)

(73) Assignee: Aisin AW Co., Ltd., Aichi-Ken (JP)

( * ) Notice: Subject to any disclaimer, the term of this patent is extended or adjusted under 35 U.S.C. 154(b) by 179 days.

(21) Appl. No.: 13/234,736

(22) Filed: Sep. 16, 2011

(65) Prior Publication Data

US 2012/0080282 A1 Apr. 5, 2012

(30) Foreign Application Priority Data

Sep. 30, 2010 (JP) ................. 2010-222534

(51) Int. Cl.
*F16H 45/02* (2006.01)
*F16D 33/18* (2006.01)

(52) U.S. Cl.
CPC ........ *F16H 45/02* (2013.01); *F16H 2045/0294* (2013.01); *F16H 2045/0247* (2013.01); *F16H 2045/0231* (2013.01); *F16H 2045/0263* (2013.01); *F16H 2045/0205* (2013.01)
USPC ......... 192/3.29; 192/213.2; 60/338; 74/574.2

(58) Field of Classification Search
CPC .............................................. F16H 2045/0263
See application file for complete search history.

(56) References Cited

U.S. PATENT DOCUMENTS

| 6,026,940 | A * | 2/2000 | Sudau ........................... 192/3.28 |
| 6,688,441 | B1 | 2/2004 | Arhab et al. |
| 8,161,739 | B2 * | 4/2012 | Degler et al. .................. 60/338 |
| 8,342,306 | B2 * | 1/2013 | Werner et al. .................. 192/3.3 |
| 8,403,762 | B2 | 3/2013 | Steinberger |
| 2004/0226794 | A1 | 11/2004 | Sasse et al. |
| 2009/0125202 | A1 * | 5/2009 | Swank et al. .................... 701/68 |
| 2010/0236228 | A1 * | 9/2010 | Degler et al. .................... 60/338 |
| 2011/0031083 | A1 | 2/2011 | Matsuoka et al. |
| 2011/0192692 | A1 | 8/2011 | Werner et al. |
| 2011/0240429 | A1 | 10/2011 | Heuler et al. |
| 2012/0080280 | A1 | 4/2012 | Takikawa et al. |

(Continued)

FOREIGN PATENT DOCUMENTS

| DE | 10 2009 042 837 A1 | 4/2010 |
| DE | 10 2009 002 481 A1 | 6/2010 |

(Continued)

OTHER PUBLICATIONS

International Search Report for corresponding International Patent Application No. PCT/JP2011/071368 mailed Dec. 20, 2011.

(Continued)

*Primary Examiner* — Gene Crawford
*Assistant Examiner* — Mark Manley
(74) *Attorney, Agent, or Firm* — Sughrue Mion, PLLC

(57) ABSTRACT

A compact fluid transmission apparatus that is able to effectively damp vibrations transmitted to an input member with a dynamic damper and a centrifugal pendulum vibration absorber. The apparatus includes a pump impeller that is connected to an input member coupled to a motor, and a turbine runner that is rotatable together with the pump impeller. The elastic body of the damper mechanism and the elastic body of the dynamic damper overlap each other with respect to an axial direction of the fluid transmission apparatus when viewed in a radial direction of the fluid transmission apparatus, and are arranged between the turbine runner and the centrifugal pendulum vibration absorber when viewed in the radial direction.

15 Claims, 5 Drawing Sheets

(56) References Cited

U.S. PATENT DOCUMENTS

| | | |
|---|---|---|
| 2012/0080281 A1 | 4/2012 | Takikawa et al. |
| 2012/0080282 A1 | 4/2012 | Takikawa et al. |
| 2012/0111683 A1 | 5/2012 | Ito et al. |

FOREIGN PATENT DOCUMENTS

| | | | |
|---|---|---|---|
| JP | 10-169756 A | | 6/1998 |
| JP | 2004-308904 A | | 11/2004 |
| JP | 2009-115112 A | | 5/2009 |
| JP | 2009-243536 A | | 10/2009 |
| JP | 2009-293671 A | | 12/2009 |
| WO | WO 2009/067987 A1 | | 6/2009 |
| WO | 2010/000220 A1 | | 1/2010 |
| WO | WO2010/000220 | * | 1/2010 |
| WO | 2010/043194 A1 | | 4/2010 |
| WO | 2010/066665 A2 | | 6/2010 |

OTHER PUBLICATIONS

U.S. Appl. No. 13/200,752, filed Sep. 30, 2011 by Kazuyoshi Ito.
International Search Report for corresponding International Patent Application No. PCT/JP2011/072282 mailed Dec. 13, 2011.
International Search Report for corresponding International Patent Application No. PCT/JP2011/071369 mailed Dec. 20, 2011.
International Search Report for corresponding International Patent Application No. PCT/JP2011/071455 mailed Dec. 27, 2011.
U.S. Appl. No. 13/233,637, filed Sep. 15, 2011 by Yoshihiro Takikawa.
U.S. Appl. No. 13/222,712, filed Aug. 31, 2011 by Yoshihiro Takikawa.

* cited by examiner

FLUID TRANSMISSION APPARATUS

INCORPORATION BY REFERENCE

The disclosure of Japanese Patent Application No. 2010-222534 filed on Sep. 30, 2010 including the specification, drawings and abstract is incorporated herein by reference in its entirety.

BACKGROUND OF THE INVENTION

The present invention relates to a fluid transmission apparatus that includes a dynamic damper and a centrifugal pendulum vibration absorber.

DESCRIPTION OF THE RELATED ART

As a fluid transmission apparatus of this type, conventionally, there has been suggested a fluid transmission apparatus which includes: a pump impeller that is connected to an input member coupled to a motor; a turbine runner that is rotatable together with the pump impeller; a damper mechanism that has an input element, an intermediate element engaged with the input element via first elastic bodies and an output element engaged with the intermediate element via second elastic bodies and coupled to an input shaft of a transmission; a lock-up clutch mechanism that is able to carry out lockup where the input member is engaged with the input element of the damper mechanism and that is able to cancel the lockup; a dynamic damper that is formed of elastic bodies (coil springs) and the turbine runner engaged with the elastic bodies; and a centrifugal pendulum vibration absorber that includes a support member and a plurality of mass bodies each oscillatable with respect to the support member (for example, see WO 2010/043194). In the fluid transmission apparatus, the dynamic damper is formed by engaging the turbine runner with the intermediate element of the damper mechanism via the elastic bodies, and the support member of the centrifugal pendulum vibration absorber is substantially fixed to the turbine runner. Then, the elastic bodies of the dynamic damper and the mass bodies of the centrifugal pendulum vibration absorber overlap each other with respect to the radial direction of a fluid transmission apparatus when viewed in the axial direction of the fluid transmission apparatus.

However, as in the case of the above conventional fluid transmission apparatus, when the elastic bodies of the dynamic damper and the mass bodies of the centrifugal pendulum vibration absorber are arranged so as to overlap each other with respect to the radial direction when viewed in the axial direction, the axial length of the fluid transmission apparatus increases, which makes it difficult to reduce the size of the apparatus overall.

SUMMARY OF THE INVENTION

It is a main object of the present invention to provide a compact fluid transmission apparatus that is able to further effectively damp vibrations transmitted to an input member with a dynamic damper and a centrifugal pendulum vibration absorber.

The fluid transmission apparatus according to an aspect of the present invention employs the following means to achieve the above main object.

A fluid transmission apparatus according to an aspect of the present invention includes: a pump impeller that is connected to an input member coupled to a motor; a turbine runner that is rotatable together with the pump impeller; a damper mechanism that includes an input element, an elastic body and an output element; a lock-up clutch mechanism that is able to carry out lockup where the input member is coupled to an input shaft of a transmission via the damper mechanism and that is able to cancel the lockup; a dynamic damper that includes an elastic body and a mass body engaged with the elastic body; and a centrifugal pendulum vibration absorber that includes a support member and a plurality of mass bodies each oscillatable with respect to the support member. In the fluid transmission apparatus, the elastic body of the damper mechanism and the elastic body of the dynamic damper overlap each other with respect to an axial direction of the fluid transmission apparatus when viewed in a radial direction of the fluid transmission apparatus, and are arranged between the turbine runner and the centrifugal pendulum vibration absorber when viewed in the radial direction.

The fluid transmission apparatus includes the dynamic damper and the centrifugal pendulum vibration absorber in order to damp vibrations transmitted to the input member. Then, in the fluid transmission apparatus, the elastic body of the damper mechanism and the elastic body of the dynamic damper overlap each other with respect to the axial direction of the fluid transmission apparatus when viewed in the radial direction of the fluid transmission apparatus, and are arranged between the turbine runner and the centrifugal pendulum vibration absorber when viewed in the radial direction. In this way, by arranging the elastic body of the damper mechanism and the elastic body of the dynamic damper such that these elastic bodies overlap each other with respect to the axial direction when viewed in the radial direction of the fluid transmission apparatus, the axial length of the fluid transmission apparatus is reduced to thereby make it possible to reduce the size of the apparatus overall. In addition, by arranging the elastic body of the damper mechanism and the elastic body of the dynamic damper between the turbine runner and the centrifugal pendulum vibration absorber when viewed in the radial direction of the fluid transmission apparatus, the arrangement space for the centrifugal pendulum vibration absorber is sufficiently ensured while suppressing an increase in the size of the fluid transmission apparatus to thereby make it possible to increase the flexibility of selection of the size (radial length) of each mass body of the centrifugal pendulum vibration absorber. As a result, it is possible to implement the compact fluid transmission apparatus that is able to effectively damp vibrations transmitted to the input member with the dynamic damper and the centrifugal pendulum vibration absorber.

In addition, the mass body of the dynamic damper may be the turbine runner that is engaged with the elastic body of the dynamic damper. Thus, it is possible to structure the dynamic damper while reducing the size of the fluid transmission apparatus overall and suppressing an increase in the number of components. Then, when the turbine runner is used as the mass body of the dynamic damper, it is possible to engage the elastic body, which is arranged between the turbine runner and the centrifugal pendulum vibration absorber when viewed in the radial direction of the fluid transmission apparatus, with the turbine runner while suppressing an increase in the axial length of the fluid transmission apparatus.

Furthermore, the damper mechanism may include a first elastic body and a second elastic body, which are arranged apart from each other in the radial direction, as the elastic body, and the elastic body of the dynamic damper may be arranged between the first elastic body and second elastic body of the damper mechanism when viewed in the axial direction. In this way, when the damper mechanism includes the first and second elastic bodies on the radially outer side and on the radially inner side, by arranging the elastic body of the dynamic damper between the first elastic body and second elastic body of the damper mechanism when viewed in the axial direction, the first or second elastic body of the damper mechanism, which is on the radially outer side, may be arranged in a region near the outer peripheral end of the turbine runner, which tends to be a dead space, and the arrangement space for the elastic body of the dynamic damper may be ensured between the first elastic body and the second elastic body. Thus, it is possible to reduce the size of the fluid transmission apparatus overall.

In addition, the damper mechanism may include a first elastic body engaged with the input element and a second elastic body arranged apart from the first elastic body in the radial direction and engaged with the output element as the elastic body, and may include an intermediate element engaged with the first elastic body and the second elastic body, and the elastic body of the dynamic damper may be supported by the intermediate element, between the first elastic body and second elastic body of the damper mechanism when viewed in the axial direction. Thus, the first or second elastic body of the damper mechanism, which is on the radially outer side, may be arranged in a region near the outer peripheral end of the turbine runner, which tends to be a dead space, and the arrangement space for the elastic body of the dynamic damper may be ensured between the first elastic body and the second elastic body. Then, by supporting the elastic body of the dynamic damper by the intermediate element, between the first elastic body and second elastic body of the damper mechanism when viewed in the axial direction, it is possible to reduce members and spaces required for supporting the elastic body of the dynamic damper. Thus, it is possible to reduce the size of the fluid transmission apparatus overall.

Furthermore, the elastic body of the dynamic damper may be engaged with the intermediate element of the damper mechanism, and the support member of the centrifugal pendulum vibration absorber may be connected to the output element of the damper mechanism. In this way, by connecting the dynamic damper to the intermediate element of the damper mechanism, it is possible to further effectively suppress the resonance of the damper mechanism overall by suppressing vibrations of the intermediate element that is interposed between the first elastic body and the second elastic body and, therefore, vibrates the most among the elements of the damper mechanism, and it is possible to further quickly converge the vibrations of the system overall, formed of the damper mechanism, the dynamic damper and the centrifugal pendulum vibration absorber, by shifting the resonance point of the dynamic damper toward a lower rotational speed side. Furthermore, by connecting the centrifugal pendulum vibration absorber to the output element of the damper mechanism, it is possible to suppress the resonance of the dynamic damper, that is, vibrations that occur as vibrations are damped by the dynamic damper, with the centrifugal pendulum vibration absorber. Thus, with the above structure, vibrations transmitted to the input member may be further effectively damped by the dynamic damper and the centrifugal pendulum vibration absorber.

In addition, the support member of the centrifugal pendulum vibration absorber may be fixed to the output element of the damper mechanism on the radially inner side of one of the first and second elastic bodies of the damper mechanism, the one of the first and second elastic bodies being arranged on the radially inner side among the first and second elastic bodies. Thus, a larger arrangement space for the centrifugal pendulum vibration absorber is ensured to thereby make it possible to further increase the flexibility of selection of the size (radial length) of each mass body of the centrifugal pendulum vibration absorber.

Furthermore, the lock-up clutch mechanism may include a lock-up piston that has a portion arranged between the input member and the centrifugal pendulum vibration absorber and that is able to be moved in the axial direction to be frictionally engaged with the input member, and the fluid transmission apparatus may further include an elastic body support member that is formed separately from the lock-up piston and is supported around an axis of the fluid transmission apparatus, and that supports one of the first and second elastic bodies of the damper mechanism, the one of the first and second elastic bodies being arranged on the radially most outer side among the first and second elastic bodies. Thus, without impairing the assemblability of the fluid transmission apparatus, it is possible to arrange the first and second elastic bodies of the damper mechanism and the elastic body of the dynamic damper such that the first and second elastic bodies and the elastic body of the dynamic damper overlap each other with respect to the axial direction when viewed in the radial direction of the fluid transmission apparatus and the first and second elastic bodies of the damper mechanism and the elastic body of the dynamic damper are located between the turbine runner and the centrifugal pendulum vibration absorber when viewed in the radial direction.

In addition, the elastic body support member may be the input element that is formed in an annular shape so as to slidably hold the one of the first and second elastic bodies of the damper mechanism, the one of the first and second elastic bodies being arranged on the radially most outer side among the first and second elastic bodies, and to be engaged with the lock-up piston integrally rotatably about the axis, and an inner peripheral portion of the elastic body support member may be supported by the turbine runner rotatably about the axis of the fluid transmission apparatus with respect to the turbine runner.

Furthermore, the elastic body support member may be an annular member that is formed so as to slidably hold the one of the first and second elastic bodies of the damper mechanism, the one of the first and second elastic bodies being arranged on the radially most outer side among the first and second elastic bodies, and an inner peripheral portion of the elastic body support member may be fixed to the turbine runner.

DETAILED DESCRIPTION OF THE EMBODIMENTS

Next, a mode for carrying out the present invention will be described with reference to an embodiment.

Figure 1:
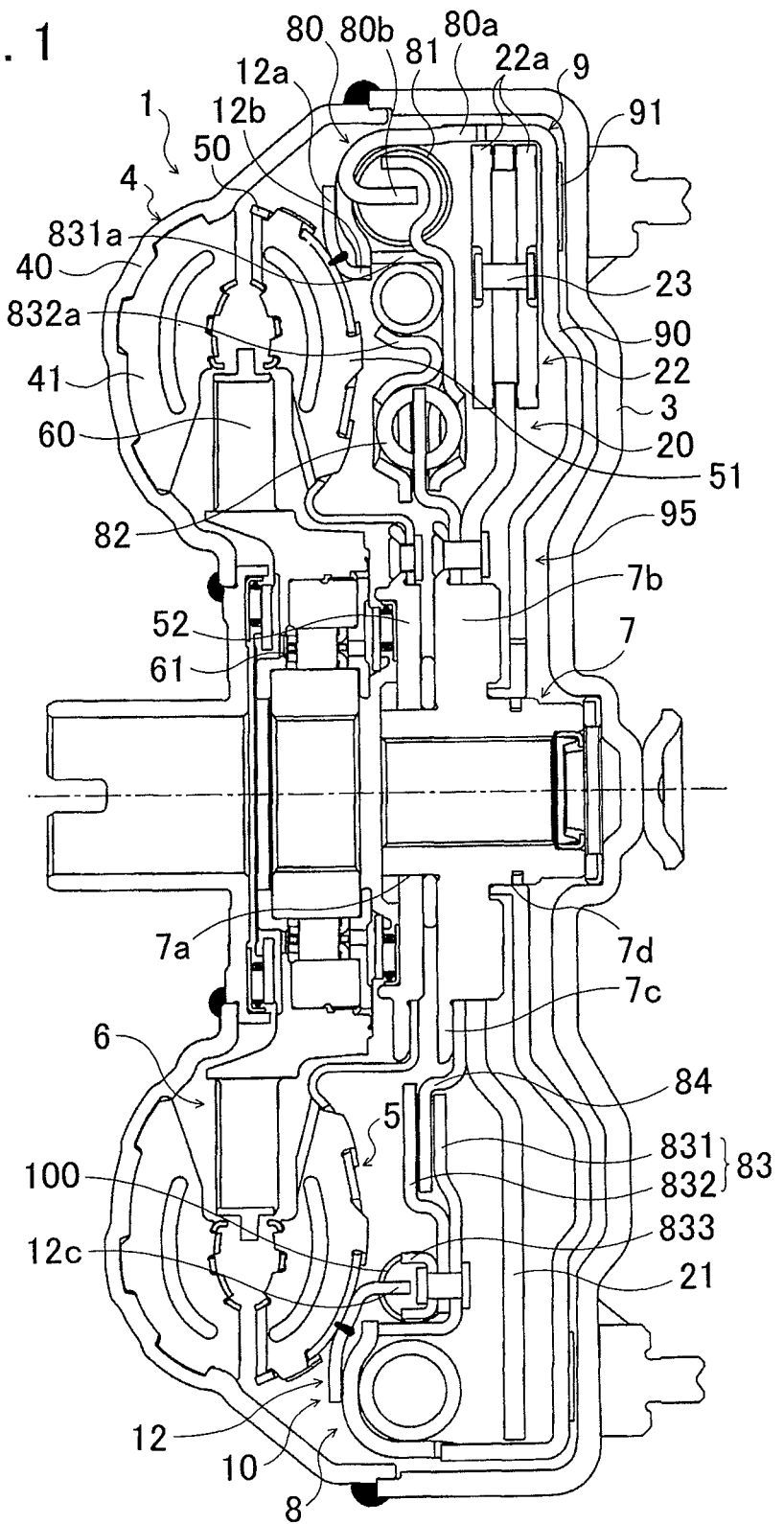
FIG. 1 is a structure diagram that shows a fluid transmission apparatus 1 according to an embodiment of the present invention.

FIG. 1 is a structure diagram that shows a fluid transmission apparatus 1 according to the embodiment of the present invention. The fluid transmission apparatus 1 shown in the drawing is a torque converter that is mounted, as a starting apparatus, on a vehicle equipped with an engine (internal combustion engine) that serves as a motor. The fluid transmission apparatus 1 includes a front cover (input member) 3 that is coupled to a crankshaft of the engine (not shown), a pump impeller (input-side fluid transmitting element) 4 that is fixed to the front cover 3, a turbine runner (output-side fluid transmitting element) 5 that is rotatable coaxially with the pump impeller 4, a stator 6 that rectifies the flow of hydraulic oil (hydraulic fluid) from the turbine runner 5 to the pump impeller 4, a damper hub (output member) 7 that is fixed to an input shaft of a transmission (not shown), which is an automatic transmission (AT) or a continuously variable transmission (CVT), a damper mechanism 8 that is connected to the damper hub 7, and a friction-type single disc lock-up clutch mechanism 9 that has a lock-up piston 90 connected to the damper mechanism 8.

The pump impeller 4 has a pump shell 40 that is airtightly fixed to the front cover 3 and a plurality of pump blades 41 that are arranged on the inner surface of the pump shell 40. The turbine runner 5 has a turbine shell 50 and a plurality of turbine blades 51 that are arranged on the inner surface of the turbine shell 50. The turbine shell 50 is fixed to a turbine hub 52 via rivets. The turbine hub 52 is rotatably fitted to a hub support portion 7a that is formed at the left end (end portion on the transmission side) of the damper hub 7 in the drawing. The pump impeller 4 and the turbine runner 5 face each other. The stator 6 that is rotatable coaxially with the pump impeller 4 and the turbine runner 5 is arranged therebetween. The stator 6 has a plurality of stator blades 60. The rotational direction of the stator 6 is set to only one direction by a one-way clutch 61. These pump impeller 4, turbine runner 5 and stator 6 form a torus (annular flow passage) through which hydraulic oil circulates.

As shown in FIG. 1, the damper mechanism 8 is arranged in proximity to the back surface (right side in the drawing) of the turbine runner 5 so as to be located between the turbine runner 5 and the lock-up piston 90. The damper mechanism 8 according to the embodiment includes a drive member 80 that serves as an input element and an elastic body support member, an intermediate member (intermediate element) 83 that is engaged with the drive member 80 via a plurality of first coil springs (first elastic bodies) 81 and a driven plate (output element) 84 that is engaged with the intermediate member 83 via a plurality of second coil springs (second elastic bodies) 82 that are arranged so as to be spaced apart from the first coil springs 81 in the radial direction of the fluid transmission apparatus 1.

The drive member 80 is an annular member that is formed separately from the lock-up piston 90 of the lock-up clutch mechanism 9 so as to slidably hold the first coil springs 81 by surrounding about half of the outer periphery of each of the first coil springs 81 arranged on the radially most outer side among the first and second coil springs 81 and 82 of the damper mechanism 8. The drive member 80 according to the embodiment has an engaging portion 80a that is engaged with the outer peripheral portion of the lock-up piston 90 and a plurality of spring contact portions 80b that are respectively in contact with one ends of the corresponding first coil springs 81. Then, as shown in FIG. 1, the drive member 80 is arranged in a region near the outer peripheral end of the turbine runner 5, which tends to be a dead space, and is supported rotatably with respect to the turbine runner 5 by a support member 12 fixed to the outer peripheral portion of the turbine shell 50 of the turbine runner 5. The support member 12 has a radial support portion 12a that extends substantially in the radial direction of the fluid transmission apparatus 1 and that slidably supports the outer side surface (outer side surface on the turbine runner 5-side in the drawing) of the drive member 80 and a plurality of axial support portions 12b each of which extends substantially in the axial direction of the fluid transmission apparatus 1 and which slidably support the inner peripheral portion of the drive member 80. Thus, the drive member 80 engaged with the lock-up piston 90 is integrally rotatable about the axis of the fluid transmission apparatus 1 together with the lock-up piston 90.

The plurality of first coil springs 81 are slidably held at predetermined intervals in the circumferential direction by the drive member 80, and are arranged in the outer peripheral side region of a housing inner space defined by the front cover 3 and the pump shell 40 of the pump impeller 4. In addition, the plurality of second coil springs 82 each have a stiffness (spring constant) higher than that of each first coil spring 81, and are slidably held at predetermined intervals in the circumferential direction by the intermediate member 83 on the radially inner side of the first coil springs 81.

The intermediate member 83 of the damper mechanism 8 is formed of an annular first intermediate plate 831 that is arranged on the front cover 3-side and an annular second intermediate plate 832 that is arranged on the turbine runner 5-side and that is fixed to the first intermediate plate 831 via rivets. The first intermediate plate 831 has a plurality of first spring contact portions at its outer peripheral side. The plurality of first spring contact portions are respectively in contact with the other ends of the corresponding first coil springs 81. The first intermediate plate 831 has a plurality of second spring support portions at its inner peripheral side for the purpose of holding the second coil springs 82. The second intermediate plate 832 has second spring support portions that respectively face the second spring support portions of the first intermediate plate 831 to hold the second coil springs 82. Then, at least one of the first and second intermediate plates 831 and 832 has a plurality of spring contact portions that are respectively in contact with one ends of the corresponding second coil springs 82. The driven plate 84 is arranged between the first intermediate plate 831 and the second intermediate plate 832. The driven plate 84 is fitted to an aligning portion 7b that extends from a center portion (right side of the hub support portion 7a in the drawing) of the damper hub 7 with respect to the axial direction of the damper hub 7 outward in the radial direction of the fluid transmission apparatus 1, and is fixed via rivets to a radially extended portion 7c that extends from an end portion of the aligning portion 7b, on the hub support portion 7a-side, outward in the radial direction of the fluid transmission apparatus 1.

The lock-up clutch mechanism 9 is able to carry out lockup where the front cover 3 is coupled to the damper hub 7 via the damper mechanism 8, and is able to cancel the lockup. In the embodiment, as shown in FIG. 1, the lock-up piston 90 of the lock-up clutch mechanism 9 is arranged inside the front cover 3 and near the inner wall surface of the front cover 3 on the engine side (right side in the drawing), and is fitted to a piston support portion 7d so as to be slidable in the axial direction and rotatable with respect to the piston support portion 7d. The piston support portion 7d is formed in the damper hub 7 (right end in the drawing) so as to be located on the opposite side of the aligning portion 7b from the hub support portion 7a. In addition, a friction material 91 is stuck to the outer peripheral side surface of the lock-up piston 90 on the front cover 3-side. Then, a lock-up chamber 95 is defined between the back surface (right side surface in the drawing) of the lock-up piston 90 and the front cover 3. The lock-up chamber 95 is connected to a hydraulic control unit (not shown) via a hydraulic oil supply hole (not shown) and an oil passage (not shown) that is formed in the input shaft.

When power is transmitted between the pump impeller 4 and the turbine runner 5 without carrying out lockup by the lock-up clutch mechanism 9, hydraulic oil supplied to the pump impeller 4 and the turbine runner 5 flows into the lock-up chamber 95, and the lock-up chamber 95 is filled with the hydraulic oil. Thus, at this time, the lock-up piston 90 is not moved toward the front cover 3, so the lock-up piston 90 is not frictionally engaged with the front cover 3. In addition, when the pressure inside the lock-up chamber 95 is reduced by the hydraulic control unit (not shown), the lock-up piston 90 is moved toward the front cover 3 due to the pressure difference to thereby be frictionally engaged with the front cover 3. Thus, the front cover 3 is coupled to the damper hub 7 via the damper mechanism 8, and, accordingly, power from the engine is transmitted to the input shaft of the transmission via the front cover 3, the damper mechanism 8 and the damper hub 7. Note that, when reducing the pressure inside the lock-up chamber 95 is stopped, the lock-up piston 90 separates from the front cover 3 due to reduction in pressure difference resulting from the flow of hydraulic oil into the lock-up chamber 95. Thus, lockup is cancelled.

Here, in the above fluid transmission apparatus 1, when lockup is carried out at the time when the rotational speed of the engine coupled to the front cover 3 has reached an extremely low lock-up rotational speed Nlup, that is, for example, about 1000 rpm, power transmission efficiency between the engine and the transmission is improved to thereby make it possible to further improve the fuel economy of the engine. Therefore, in order to favorably damp vibrations generated in a path from the front cover (input member) 3 to the damper hub (output member) 7 when the rotational speed of the front cover 3 (engine rotational speed) is around an extremely low predetermined lock-up rotational speed Nlup, the fluid transmission apparatus 1 according to the embodiment includes a dynamic damper 10 and a centrifugal pendulum vibration absorber 20. The dynamic damper 10 is formed of the turbine runner 5 and a plurality of coil springs (third elastic bodies) 100.

As shown in FIG. 1, the plurality of coil springs 100 that constitute the dynamic damper 10 each are slidably supported (held) at predetermined intervals in the circumferential direction by the intermediate member 83 between the first coil springs 81 and second coil springs 82 of the damper mechanism 8 when viewed in the axial direction of the fluid transmission apparatus 1. That is, the first intermediate plate 831 that constitutes the intermediate member 83 according to the embodiment has a plurality of axially extended portions 831a that respectively extend from between the outer peripheral-side contact portions, which are in contact with the first coil springs 81, and the inner peripheral-side second spring support portions, when viewed in the axial direction of the fluid transmission apparatus 1, toward the turbine runner 5 (left side in the drawing) in the axial direction. Furthermore, the second intermediate plate 832 that constitutes the intermediate member 83 has a plurality of spring retaining portions 832a that are formed on the radially outer side of the second spring support portions so as to overlap with the axially extended portions 831a of the first intermediate plate 831 with respect to the axial direction when viewed in the radial direction of the fluid transmission apparatus 1. Then, the plurality of coil springs 100 are respectively held by the axially extended portions 831a of the first intermediate plate 831 and the spring retaining portions 832a of the second intermediate plate 832, and overlap with the first and second coil springs 81 and 82 of the damper mechanism 8 with respect to the axial direction when viewed in the radial direction of the fluid transmission apparatus 1.

In this way, by supporting the coil springs 100 of the dynamic damper 10 using the intermediate member 83 between the first coil springs 81 and second coil springs 82 of the damper mechanism 8 when viewed in the axial direction of the fluid transmission apparatus 1, members and spaces required for supporting the coil springs 100 of the dynamic damper 10 are reduced to thereby make it possible to further reduce the size of the fluid transmission apparatus 1 overall. In addition, by arranging the first and second coil springs 81 and 82 of the damper mechanism 8 and the coil springs 100 of the dynamic damper 10 such that the first and second coil springs 81 and 82 and the coil springs 100 overlap each other with respect to the axial direction when viewed in the radial direction of the fluid transmission apparatus 1, the axial length of the fluid transmission apparatus 1 is reduced to thereby make it possible to reduce the size of the apparatus overall. Note that, in the embodiment, as shown in FIG. 1, the plurality of axially extended portions 831a of the first intermediate plate 831 are formed so that the respective end surfaces (end surfaces at the left side in the drawing) are able to contact the drive member 80 that is rotatably supported by the turbine runner 5. Thus, it is possible to restrict movement of the drive member 80 in the axial direction using the axially extended portions 831a.

Then, one end of each of the coil springs 100 held by the intermediate member 83 is in contact with (is engaged with) a corresponding one of a plurality of spring contact portions 12c extending from between the axial support portions 12b of the support member 12, and the other end of each of the coil springs 100 held by the intermediate member 83 corresponds to the one that is brought into contact with (engagement with) a corresponding one of a plurality of spring contact portions 833 formed in the intermediate member 83 of the damper mechanism 8. In the embodiment, for example, members having a substantially U shape cross section are fixed to the first and second intermediate plates 831 and 832 via rivets to thereby form the plurality of spring contact portions 833 in the intermediate member 83. Thus, in the fluid transmission apparatus 1 according to the embodiment, the dynamic damper 10 is connected to the intermediate member 83 of the damper mechanism 8.

Figure 2:
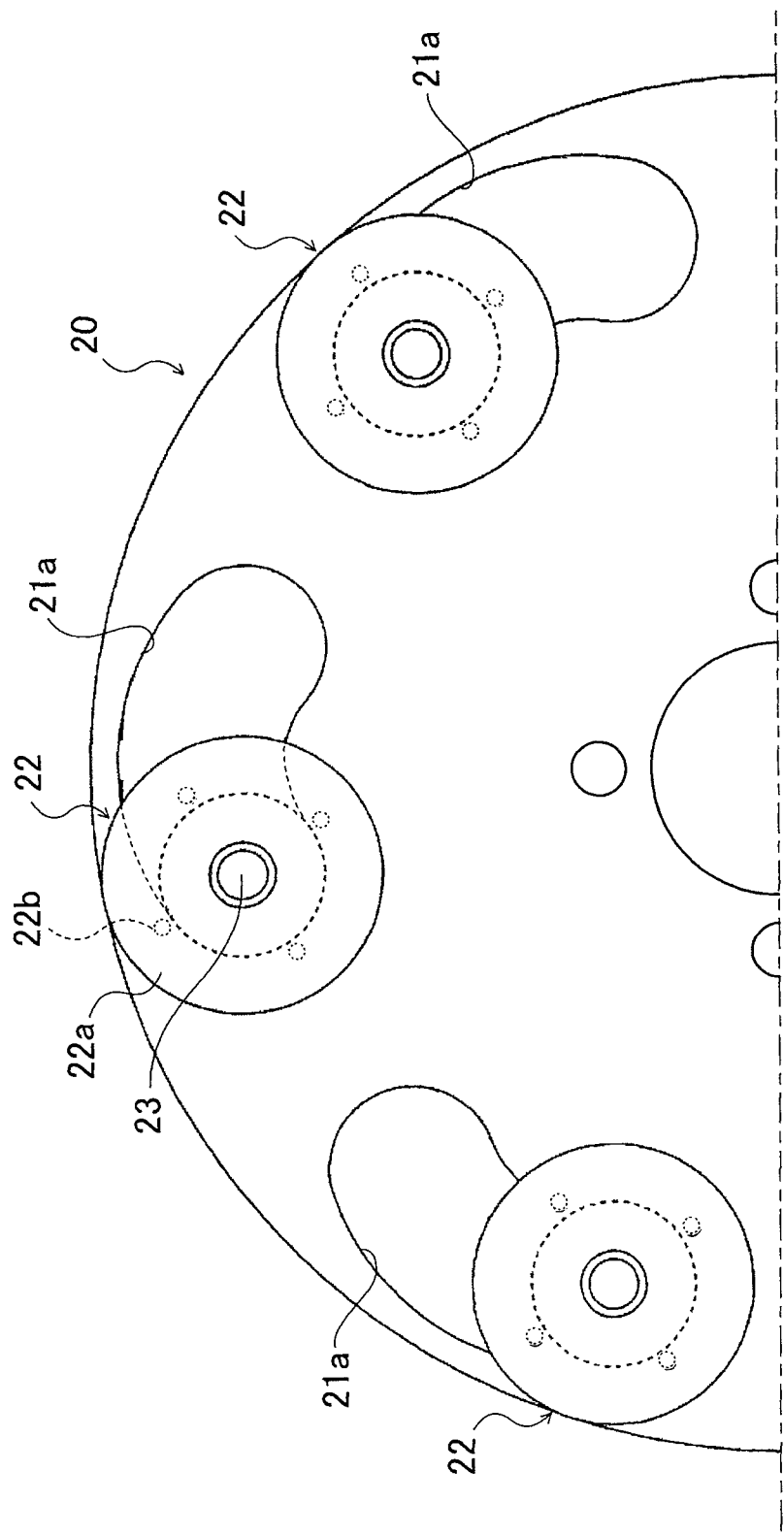
FIG. 2 is a structure diagram that shows a centrifugal pendulum vibration absorber 20 of the fluid transmission apparatus 1.

As shown in FIG. 1 and FIG. 2, the centrifugal pendulum vibration absorber 20 includes an annular support member 21 that is coupled to the damper mechanism 8 and a plurality of mass bodies 22 that are oscillatable with respect to the support member 21. The support member 21 according to the embodiment has a plurality of guide holes 21a, which are arc-shaped oblong holes, at equiangular intervals as shown in FIG. 2. In addition, each of the mass bodies 22 according to the embodiment is formed of two disc-shaped metal plates 22a and a support shaft 23. The support shaft 23 is rollably inserted in the guide hole 21a of the support member 21, and the metal plates 22a are fixed to both ends of the support shaft 23. Furthermore, a plurality of (four in the embodiment) minute protrusions 22b are formed on the surface of each metal plate 22a, facing the support member 21, so as to extend toward the support member 21 in order to suppress a slide between the surface overall and the support member 21.

Then, the centrifugal pendulum vibration absorber 20 according to the embodiment is arranged inside the lock-up piston 90 such that the damper mechanism 8 is located between the centrifugal pendulum vibration absorber 20 and the turbine runner 5 and a portion of lock-up piston 90, extending in the radial direction of the lock-up piston 90, is arranged between the front cover 3 and the centrifugal pendulum vibration absorber 20, and is fixed to the driven plate 84 of the damper mechanism 8 and the damper hub 7. That is, the support member 21 of the centrifugal pendulum vibration absorber 20 according to the embodiment is fixed to the inner peripheral portion of the driven plate 84 and the radially extended portion 7c of the damper hub 7 via rivets on the radially inner side of the second coil springs 82 that are arranged on the radially inner side among the first and second coil springs 81 and 82 of the damper mechanism 8. At the time of assembling the centrifugal pendulum vibration absorber 20, the driven plate 84 and the support member 21 of the centrifugal pendulum vibration absorber 20 are fitted to the aligning portion 7b of the damper hub 7, and the radially extended portion 7c of the damper hub 7, the driven plate 84 and the support member 21 of the centrifugal pendulum vibration absorber 20 are fixed via rivets. Thus, it is possible to fix the centrifugal pendulum vibration absorber 20 to the driven plate 84 of the damper mechanism 8 and the damper hub 7 while the centrifugal pendulum vibration absorber 20 is aligned around the axis of the fluid transmission apparatus 1 with high accuracy.

As described above, when the support member 21 of the centrifugal pendulum vibration absorber 20 is fixed to the driven plate 84 and the damper hub 7 on the radially inner side of the second coil springs 82 of the damper mechanism 8, a larger arrangement space for the centrifugal pendulum vibration absorber 20 is ensured to thereby make it possible to further increase the flexibility of selection of the size (radial length) of each mass body 22 of the centrifugal pendulum vibration absorber 20. In addition, in the fluid transmission apparatus 1 according to the embodiment, the first and second coil springs 81 and 82 of the damper mechanism 8 and the coil springs 100 of the dynamic damper 10 are arranged between the turbine runner 5 and the centrifugal pendulum vibration absorber 20 when viewed in the radial direction of the fluid transmission apparatus 1, the arrangement space for the centrifugal pendulum vibration absorber 20 is sufficiently ensured while suppressing an increase in the size of the fluid transmission apparatus 1 to thereby make it possible to increase the flexibility of selection of the size (radial length) of each mass body 22 of the centrifugal pendulum vibration absorber 20.

Next, the operation of the above-described fluid transmission apparatus 1 will be described with reference to FIG. 3.

Figure 3:
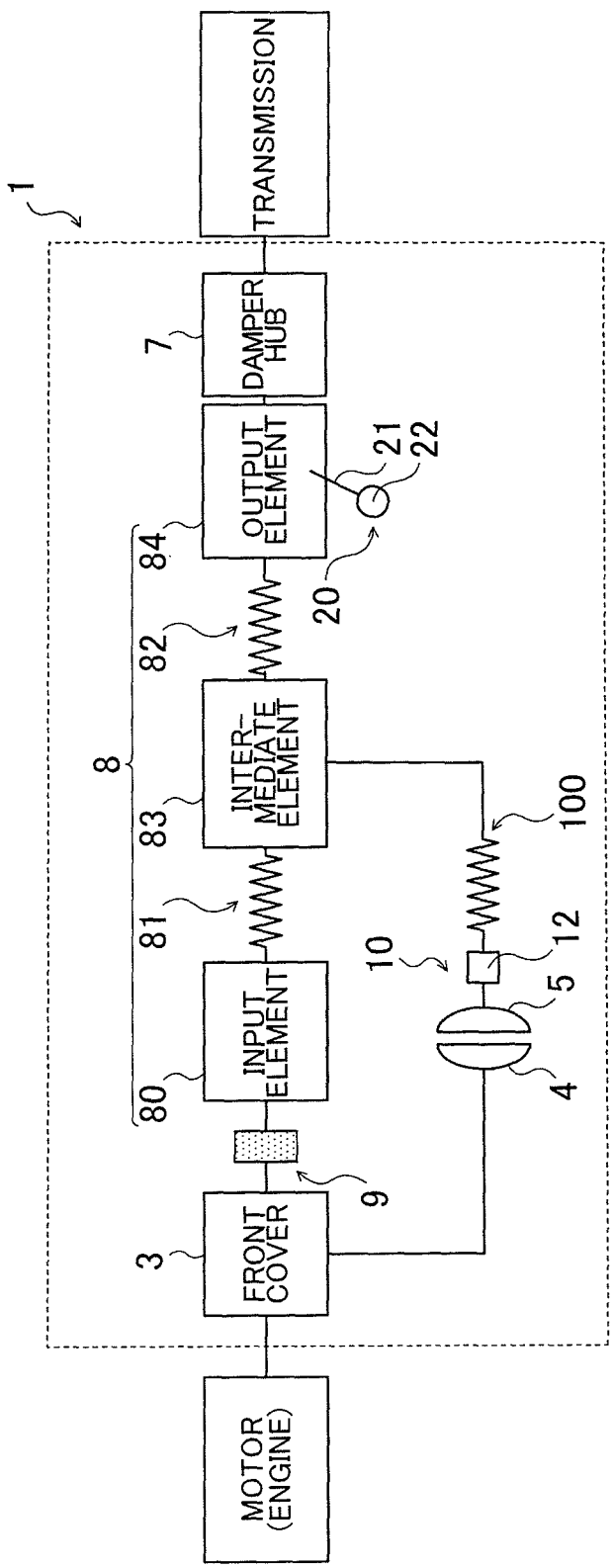
FIG. 3 is a schematic block diagram of the fluid transmission apparatus 1.

As is apparent from FIG. 3, during lockup cancellation where the front cover 3 is not coupled to the damper hub 7 via the damper mechanism 8 by the lock-up clutch mechanism 9, power from the engine that serves as a motor is transmitted to the input shaft of the transmission via a path formed of the front cover 3, the pump impeller 4, the turbine runner 5, the plurality of coil springs 100, the intermediate member 83 of the damper mechanism 8, the second coil springs 82, the driven plate 84 and the damper hub 7.

Furthermore, in the fluid transmission apparatus 1 according to the embodiment, during lockup cancellation, the support member 21 coupled to the driven plate 84 of the damper mechanism 8 (and the damper hub 7) also rotates about the axis of the fluid transmission apparatus 1 together with the damper mechanism 8. With the rotation of the support member 21, the support shafts 23 of the mass bodies 22 that constitute the centrifugal pendulum vibration absorber 20 are guided by the respective guide holes 21a of the support member 21 to roll between one ends and the other ends of the corresponding guide holes 21a. Thus, the mass bodies 22 each oscillate with respect to the support member 21. Thus, vibrations opposite in phase to vibrations (resonance) of the driven plate 84 of the damper mechanism 8 are applied from the centrifugal pendulum vibration absorber 20 to the driven plate 84 of the damper mechanism 8 to thereby make it possible to absorb (damp) vibrations transmitted to the front cover 3 with the centrifugal pendulum vibration absorber 20 as well.

On the other hand, during lockup where the front cover 3 is coupled to the damper hub 7 via the damper mechanism 8 by the lock-up clutch mechanism 9, power from the engine that serves as a motor is transmitted to the input shaft of the transmission via a path formed of the front cover 3, the lock-up clutch mechanism 9, the drive member 80, the first coil springs 81, the intermediate member 83, the second coil springs 82, the driven plate 84 and the damper hub 7. At this time, fluctuations in torque input into the front cover 3 are absorbed mainly by the first and second coil springs 81 and 82 of the damper mechanism 8.

In addition to the above damper mechanism 8, during lockup, the plurality of coil springs 100 that are engaged with the turbine runner 5 and the intermediate member 83 of the damper mechanism 8 constitute the dynamic damper 10 together with the turbine runner 5, and it is possible to effectively absorb (damp) vibrations, transmitted from the engine side to the front cover 3, from the intermediate plate 83 of the damper mechanism 8 with the dynamic damper 10. Furthermore, in the fluid transmission apparatus 1 according to the embodiment, as the damper mechanism 8 coupled to the front cover 3 by the lock-up piston 90 in accordance with lockup rotates together with the front cover 3, the support member 21 coupled to the driven plate 84 of the damper mechanism 8 (and the damper hub 7) also rotates about the axis of the fluid transmission apparatus 1 together with the driven plate 84 (and the damper hub 7). With the rotation of the support member 21, the support shafts 23 of the mass bodies 22 that constitute the centrifugal pendulum vibration absorber 20 are guided by the respective guide holes 21a of the support member 21 to roll between one ends and the other ends of the corresponding guide holes 21a. Thus, the mass bodies 22 each oscillate with respect to the support member 21. Thus, vibrations opposite in phase to vibrations (resonance) of the driven plate 84 are applied from the centrifugal pendulum vibration absorber 20 to the driven plate 84 of the damper mechanism 8 to thereby make it possible to absorb (damp) vibrations transmitted to the front cover 3 with the centrifugal pendulum vibration absorber 20 as well.

Thus, in the fluid transmission apparatus 1 according to the embodiment, by adjusting the stiffness (spring constant) of each coil spring 100, the weight (inertia) of the turbine runner 5, and the like, which define the vibration damping characteristic (resonant frequency) of the dynamic damper 10, the size (particularly, the radial length) and weight of each mass body 22, the shape and dimensions of each guide hole 21a, and the like, which define the vibration damping characteristic of the centrifugal pendulum vibration absorber 20, on the basis of the number of cylinders of the engine that serves as a motor and the lock-up rotational speed Nlup at which lockup is carried out, even if lockup is carried out when the rotational speed of the engine is extremely low like, for example, 1000 rpm, vibrations transmitted from the engine that serves as a motor to the fluid transmission apparatus 1, that is, the front cover 3, are effectively absorbed (damped) by the dynamic damper 10 and the centrifugal pendulum vibration absorber 20 to thereby make it possible to favorably suppress transmission of the vibrations to the damper hub 7 via the driven plate 84. Then, with the fluid transmission apparatus 1, it is possible to improve the power transmission efficiency and, consequently, it is possible to improve the fuel economy of the engine, by carrying out lockup at the time when the rotational speed of the engine has reached the lock-up rotational speed Nlup that is relatively low like, for example, about 1000 rpm.

Figure 4:
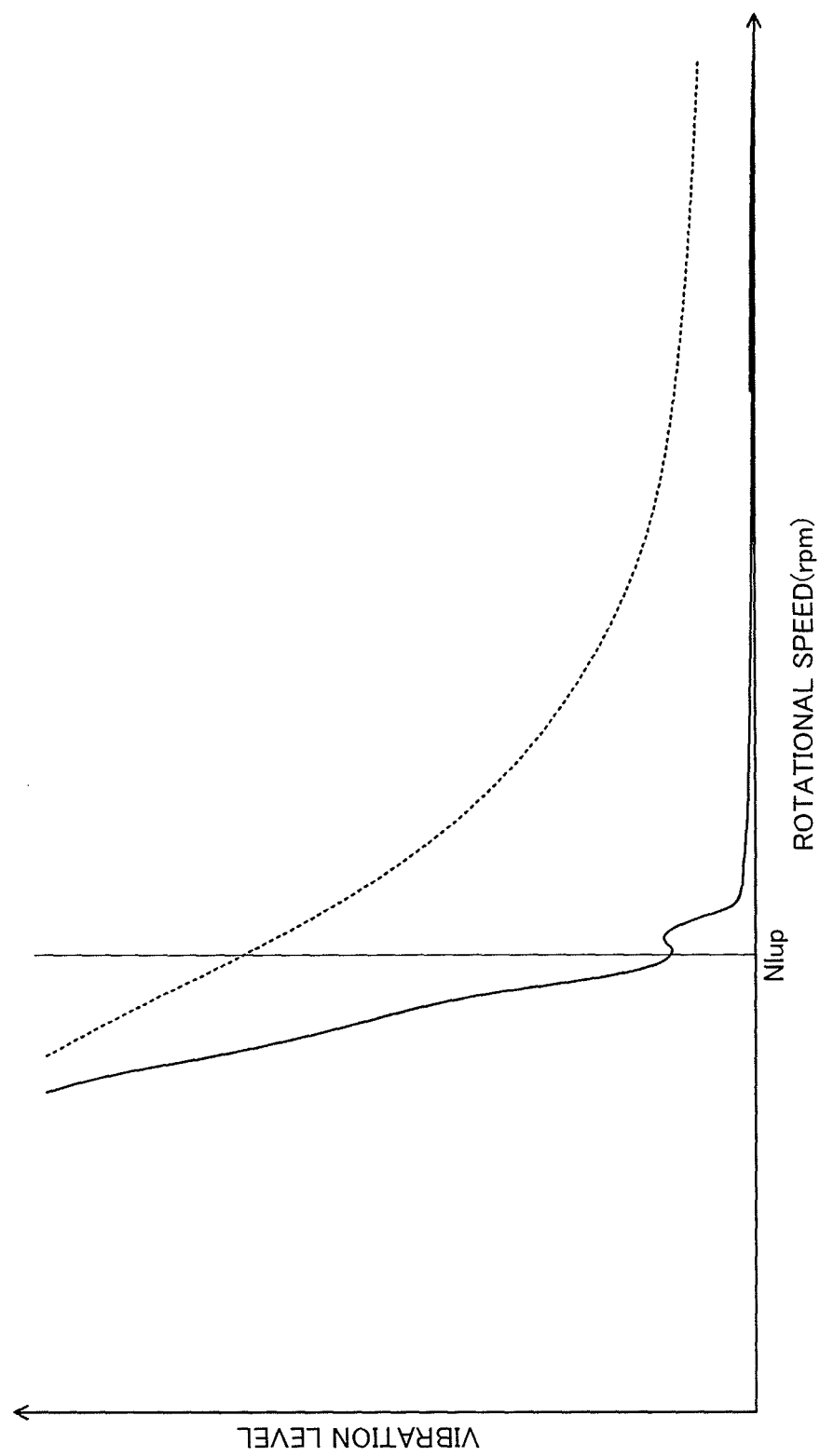
FIG. 4 is an explanatory graph that illustrates the correlation between the rotational speed of an engine, which serves as a motor, and the vibration level of the fluid transmission apparatus 1.

FIG. 4 is an explanatory graph that illustrates the correlation between the rotational speed of the engine, which serves as a motor, and the vibration level of each of the above-described fluid transmission apparatus 1, and the like. The graph illustrates the correlation between the rotational speed of the engine (front cover 3) and the vibration level in a path of each fluid transmission apparatus from the front cover 3 to the damper hub 7 in a plurality of fluid transmission apparatuses. The correlation was obtained through simulations of a torsional vibration system conducted in order to obtain a fluid transmission apparatus suitable for combination with cylinder-saving (few-cylinder) engines, such as a three-cylinder engine or a four-cylinder engine, that generate relatively large vibrations. In the above simulations, the specifications of the engine that serves as a motor and the specifications of the pump impeller 4, turbine runner 5, damper mechanism 8 and lock-up clutch mechanism 9 were basically the same.

In FIG. 4, the solid line indicates the vibration level of the fluid transmission apparatus 1 according to the above embodiment, and the dotted line indicates the vibration level of a fluid transmission apparatus obtained by omitting the dynamic damper 10 and the centrifugal pendulum vibration absorber 20 from the fluid transmission apparatus 1 according to the above embodiment. As is apparent from FIG. 4, by connecting the dynamic damper 10 to the intermediate member 83 of the damper mechanism 8, it is possible to further effectively suppress the resonance of the damper mechanism 8 overall by suppressing vibrations of the intermediate member 83 that is interposed between the first coil springs 81 and the second coil springs 82 and, therefore, vibrates the most among the elements of the damper mechanism 8, and it is possible to further quickly converge the vibrations of the system overall, formed of the damper mechanism 8, the dynamic damper 10 and the centrifugal pendulum vibration absorber 20, by shifting the resonance point of the dynamic damper 10 toward a lower rotational speed side. In addition, in the fluid transmission apparatus 1, as shown in the drawing, the resonance of the dynamic damper 10 occurs, that is, vibrations occur as vibrations are damped by the dynamic damper; however, by connecting the centrifugal pendulum vibration absorber 20 to the driven plate 84 that is the output element of the damper mechanism 8, it is possible to suppress the resonance of the dynamic damper 10, that is, vibrations that occur as vibrations are damped by the dynamic damper 10, with the centrifugal pendulum vibration absorber 20. Furthermore, in the fluid transmission apparatus 1 where the dynamic damper 10 is connected to the intermediate member 83 of the damper mechanism 8, the mass of the damper mechanism 8 increases as a whole, so the resonant frequency of the damper mechanism 8 decreases and, as a result, the resonance point of the damper mechanism 8 shifts toward a lower rotational speed side as compared with the fluid transmission apparatus from which the dynamic damper 10 is omitted to thereby make it possible to shift the resonance point of the dynamic damper 10 away from the resonance point of the damper mechanism 8. Thus, in the fluid transmission apparatus 1 according to the embodiment, it is possible to further effectively damp vibrations transmitted from the engine to the front cover 3 in a range in which the rotational speed of the engine (front cover) is low, that is, around the lock-up rotational speed Nlup determined at a lower value in terms of efficiency.

As described above, the fluid transmission apparatus 1 according to the embodiment includes the dynamic damper 10 and the centrifugal pendulum vibration absorber 20 in order to damp vibrations transmitted to the front cover 3 (input member). Then, in the fluid transmission apparatus 1, the first and second coil springs 81 and 82 of the damper mechanism 8 and the coil springs 100 of the dynamic damper 10 overlap each other with respect to the axial direction of the fluid transmission apparatus 1 when viewed in the radial direction of the fluid transmission apparatus 1, and are arranged between the turbine runner 5 and the centrifugal pendulum vibration absorber 20 when viewed in the radial direction. In this way, by arranging the first and second coil springs 81 and 82 of the damper mechanism 8 and the coil springs 100 of the dynamic damper 10 such that the first and second coil springs 81 and 82 and the coil springs 100 overlap each other with respect to the axial direction when viewed in the radial direction of the fluid transmission apparatus 1, the axial length of the fluid transmission apparatus 1 is reduced to thereby make it possible to reduce the size of the apparatus overall. In addition, by arranging the first and second coil springs 81 and 82 of the damper mechanism 8 and the coil springs 100 of the dynamic damper 10 between the turbine runner 5 and the centrifugal pendulum vibration absorber 20 when viewed in the radial direction of the fluid transmission apparatus 1, the arrangement space for the centrifugal pendulum vibration absorber 20 is sufficiently ensured while suppressing an increase in the size of the fluid transmission apparatus 1 to thereby make it possible to increase the flexibility of selection of the size (radial length) of each mass body 22 of the centrifugal pendulum vibration absorber 20. As a result, it is possible to implement the compact fluid transmission apparatus 1 that is able to effectively damp vibrations transmitted to the front cover 3 (input member) with the dynamic damper 10 and the centrifugal pendulum vibration absorber 20.

In addition, as in the case of the embodiment, by engaging the turbine runner 5 that serves as a mass body with the coil springs 100, it is possible to structure the dynamic damper 10 while reducing the size of the fluid transmission apparatus 1 overall and suppressing an increase in the number of components. Then, when the turbine runner 5 is used as the mass body of the dynamic damper 10, it is possible to easily engage the coil springs 100, which are arranged between the turbine runner 5 and the damper mechanism 8 when viewed in the radial direction of the fluid transmission apparatus 1, with the turbine runner 5 while suppressing an increase in the axial length of the fluid transmission apparatus 1. However, of course, the present invention may be applied to a fluid transmission apparatus that includes a dynamic damper that uses a member, other than the turbine runner 5, as a mass body.

Furthermore, the damper mechanism 8 includes the first coil springs 81 and the second coil spring 82, which are arranged apart from each other in the radial direction, as elastic bodies, and the coil springs 100 of the dynamic damper 10 are arranged between the first coil springs 81 and second coil springs 82 of the damper mechanism 8 when viewed in the axial direction. In this way, when the damper mechanism 8 includes the first and second coil springs 81 and 82 on the radially outer side and on the radially inner side, by arranging the coil springs 100 of the dynamic damper 10 between the first coil springs 81 and second coil springs 82 of the damper mechanism 8 when viewed in the axial direction, the first coil springs 81 of the damper mechanism 8, which are on the radially outer side, may be arranged in a region near the outer peripheral end of the turbine runner 5, which tends to be a dead space, and the arrangement space for the coil springs 10 of the dynamic damper 10 may be ensured between the first coil springs 81 and the second coil springs 82. Then, by supporting the coil springs 100 of the dynamic damper 10 by the intermediate member 83, between the first coil springs 81 and second coil springs 82 of the damper mechanism 8 when viewed in the axial direction, it is possible to reduce members and spaces required for supporting the coil springs 100 of the dynamic damper 10. Thus, it is possible to reduce the size of the fluid transmission apparatus 1 overall.

In addition, in the fluid transmission apparatus 1 according to the embodiment, the coil springs 100 of the dynamic damper 10 are engaged with the intermediate member 83 of the damper mechanism 8, and the support member 21 of the centrifugal pendulum vibration absorber 20 is connected to the driven plate (output element) 84 of the damper mechanism 8. In this way, by connecting the dynamic damper 10 to the intermediate member 83 of the damper mechanism 8, it is possible to further effectively suppress the resonance of the damper mechanism 8 overall by suppressing vibrations of the intermediate member 83 that is interposed between the first coil springs 81 and the second coil springs 82 and, therefore, vibrates the most among the elements of the damper mechanism 8, and it is possible to further quickly converge the vibrations of the system overall, formed of the damper mechanism 8, the dynamic damper 10 and the centrifugal pendulum vibration absorber 20, by shifting the resonance point of the dynamic damper 10 toward a lower rotational speed side. Furthermore, by connecting the centrifugal pendulum vibration absorber 20 to the driven plate 84 of the damper mechanism 8, it is possible to suppress the resonance of the dynamic damper 10, that is, vibrations that occur as vibrations are damped by the dynamic damper 10, with the centrifugal pendulum vibration absorber 20. Thus, with the above structure, it is possible to further effectively damp vibrations transmitted to the front cover 3 (input member) with the dynamic damper 10 and the centrifugal pendulum vibration absorber 20.

Furthermore, the support member 21 of the centrifugal pendulum vibration absorber 20 is fixed to the driven plate 84 of the damper mechanism 8 on the radially inner side of the second coil springs 82 that are arranged on the radially inner side among the first and second coil springs 81 and 82 of the damper mechanism 8. Thus, a larger arrangement space for the centrifugal pendulum vibration absorber 20 is ensured to thereby make it possible to further increase the flexibility of selection of the size (radial length) of each mass body of the centrifugal pendulum vibration absorber 20.

In addition, in the fluid transmission apparatus 1 according to the embodiment, the drive member 80 is formed in an annular shape so as to slidably hold the first coil springs 81 which are arranged on the radially most outer side among the first and second coil springs 81 and 82 of the damper mechanism 8, and to be engaged with the lock-up piston 90 integrally rotatably about the axis, and the drive member 80 is supported by the turbine runner 5, that is, the support member 12, rotatably about the axis of the fluid transmission apparatus 1 with respect to the turbine runner 5. Thus, without impairing the assemblability of the fluid transmission apparatus 1, it is possible to arrange the first and second coil springs 81 and 82 of the damper mechanism 8 and the coil springs 100 of the dynamic damper 10 such that the first and second coil springs 81 and 82 and the coil springs 100 overlap each other with respect to the axial direction when viewed in the radial direction of the fluid transmission apparatus 1 and the first and second coil springs 81 and 82 and the coil springs 100 are located between the turbine runner 5 and the centrifugal pendulum vibration absorber 20 when viewed in the radial direction.

Figure 5:
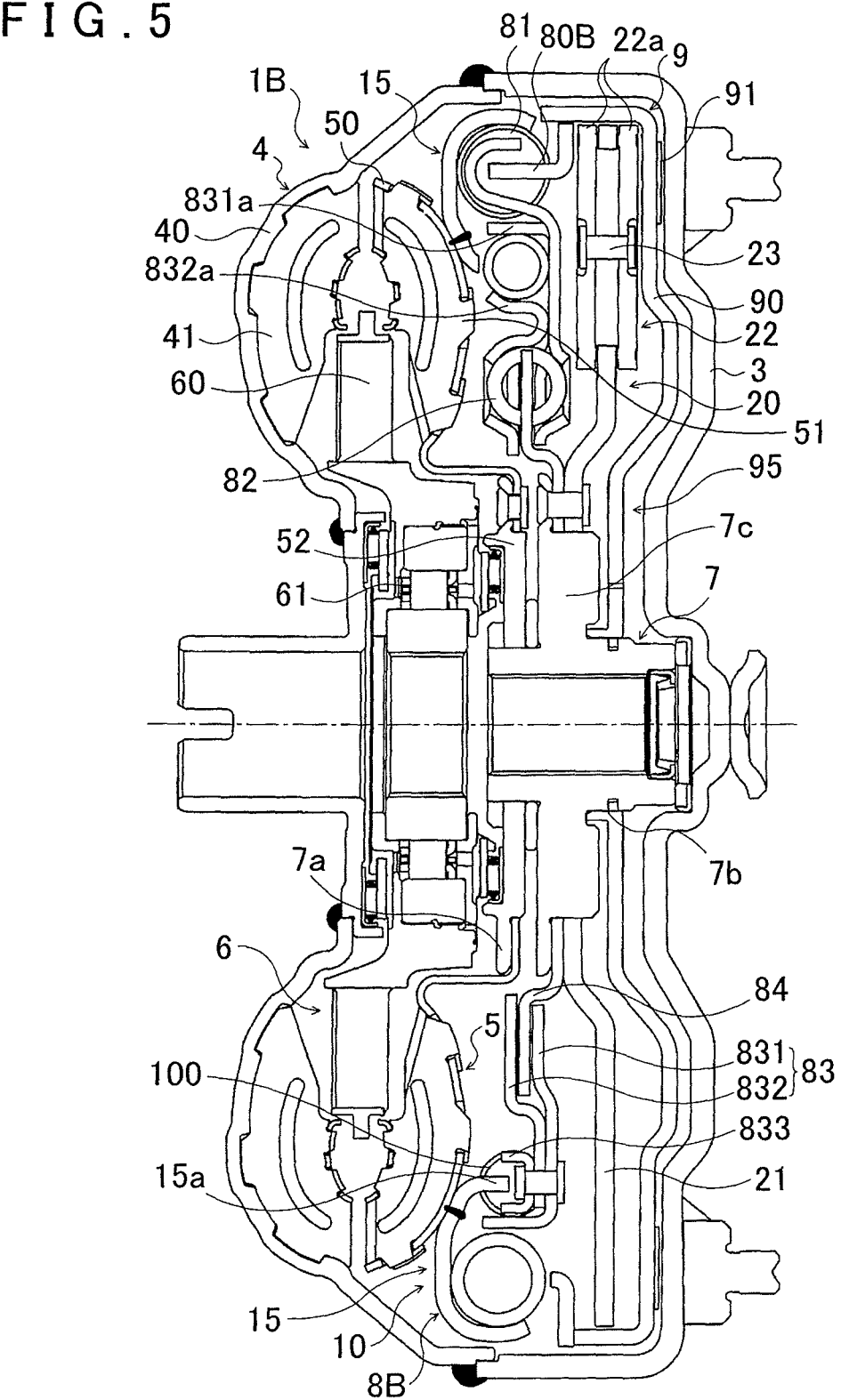
FIG. 5 is a structure diagram that shows a fluid transmission apparatus 1B according to an alternative embodiment.

FIG. 5 is a structure diagram that shows a fluid transmission apparatus 1B according to an alternative embodiment. Note that, in order to avoid overlap description, the same reference numerals are assigned to the same components among the components of the fluid transmission apparatus 1B as the components of the above-described fluid transmission apparatus 1, and the illustration and detailed description thereof are omitted.

In the fluid transmission apparatus 1B shown in FIG. 5, a drive member 80B of a damper mechanism 8B is formed as an annular member that has a plurality of spring contact portions that are fitted (fixed) to the outer peripheral portion of the lock-up piston 90 of the lock-up clutch mechanism 9 and that are respectively in contact with one ends of the corresponding first coil springs 81. Then, the fluid transmission apparatus 1B includes a spring support member 15, which is an annular member that is formed so as to slidably hold the first coil springs 81 arranged on the radially most outer side among the first and second coil springs 81 and 82 of the damper mechanism 8B. The spring support member 15 is an annular member that is formed so as to slidably hold the first coil springs 81 by surrounding part of the outer periphery of each of the first coil springs 81, and is fixed to the outer peripheral portion of the turbine shell 50. In addition, the spring support member 15 has a plurality of spring contact portions 15a, each of which is engaged with one end of a corresponding one of the coil springs 100 of the dynamic damper 10.

By employing the above structure as well, without impairing the assemblability of the fluid transmission apparatus 1B, it is possible to arrange the first and second coil springs 81 and 82 of the damper mechanism 8 and the coil springs 100 of the dynamic damper 10 such that the first and second coil springs 81 and 82 and the coil springs 100 overlap each other with respect to the axial direction when viewed in the radial direction of the fluid transmission apparatus 1B and the first and second coil springs 81 and 82 and the coil springs 100 are located between the turbine runner 5 and the centrifugal pendulum vibration absorber 20 when viewed in the radial direction. Note that, in the fluid transmission apparatus 1B shown in FIG. 5, the spring support member 15 rotates together with the turbine runner 5, so, in order not to interfere with the original movement of the first coil springs 81 of the damper mechanism 8B, a metal lining, or the like, may be arranged between the spring support member 15 and the first coil springs 81 in order to allow the first coil springs 81 to easily slide with respect to the spring support member 15.

Note that, in the above embodiment, the dynamic damper 10 is connected to the intermediate member 83 of the damper mechanism 8, and the centrifugal pendulum vibration absorber 20 is connected to the driven plate 84 of the damper mechanism 8; instead, the dynamic damper 10 may be connected to one of the intermediate member 83 and driven plate 84 of the damper mechanism 8 and the centrifugal pendulum vibration absorber 20 may be connected to the one of the intermediate member 83 and the driven plate 84, or the dynamic damper 10 may be connected to one of the intermediate member 83 and driven plate 84 of the damper mechanism 8 and the centrifugal pendulum vibration absorber 20 may be connected to the other of the intermediate member 83 and driven plate 84. With these structures as well, it is possible to effectively damp vibrations transmitted to the front cover 3 with the dynamic damper 10 and the centrifugal pendulum vibration absorber 20, so it is possible to obtain a fluid transmission apparatus suitable for combination with a cylinder-saving engine.

In addition, the above-described fluid transmission apparatuses 1 and 1B include the damper mechanisms 8 and 8B, respectively, each of which has multiples types of elastic bodies, that is, the first and second coil springs 81 and 82 and the intermediate member 83; instead, the fluid transmission apparatus according to the present invention may include a damper mechanism that has multiple types of elastic bodies but no intermediate member (intermediate element) or may include a damper mechanism that has only single type of (one type of) elastic bodies. Furthermore, the above-described fluid transmission apparatuses 1 and 1B each are structured as a torque converter that includes the pump impeller 4, the turbine runner 5 and the stator 6; instead, the fluid transmission apparatus according to the present invention may be structured as a fluid coupling that has no stator. In addition, the fluid transmission apparatus according to the present invention may include a friction-type multiple disc lock-up clutch mechanism instead of the friction-type single disc lock-up clutch mechanism 9. Furthermore, the structure of the centrifugal pendulum vibration absorber in the present invention is not limited to the structure of the above-described centrifugal pendulum vibration absorber 20.

Here, the correlation between major elements of the above embodiment, and the like, and major elements of the invention described in summary of the invention will be explained. That is, in the embodiment, and the like, the front cover 3 that is coupled to the engine that serves as a motor corresponds to "input member", the pump impeller 4 that is connected to the front cover 3 corresponds to "pump impeller", the turbine runner 5 that is rotatable together with the pump impeller 4 corresponds to "turbine runner", the damper mechanism 8 that includes the drive member 80 that serves as an input element, the first and second coil springs 81 and 82 and the driven plate 84 that serves as an output element corresponds to "damper mechanism", the lock-up clutch mechanism 9 that is able to carry out lockup where the front cover 3 is coupled via the damper mechanism 8 to the damper hub 7 connected to the input shaft of the transmission and is able to cancel the lockup corresponds to "lock-up clutch mechanism", the dynamic damper 10 that is formed of the coil springs 100 and the turbine runner 5 that serves as a mass body engaged with the coil springs 100 corresponds to "dynamic damper", and the drive member 80 of the damper mechanism 8 corresponds to "elastic body support member". In addition, the centrifugal pendulum vibration absorber 20 that includes the support member 21 and the plurality of mass bodies 22 each oscillatable with respect to the support member 21 corresponds to "centrifugal pendulum vibration absorber".

However, the correlation between the major elements of the embodiment and the major elements of the invention described in summary of the invention is one example for specifically explaining a mode in which the embodiment carries out the invention described in summary of the invention, so the correlation does not intend to limit the elements of the invention described in summary of the invention. That is, the embodiment is just one specific example of the invention described in summary of the invention, and the interpretation of the invention described in summary of the invention should be made on the basis of the description itself.

The mode for carrying out the present invention is described above with reference to the embodiment; however, the present invention is not limited to the above embodiment and, of course, may be modified into various forms without departing from the scope of the present invention.

The present invention is usable in the manufacturing field, or the like, of a fluid transmission apparatus.

What is claimed is:

1. A fluid transmission apparatus comprising:
    a pump impeller that is connected to an input member coupled to a motor;
    a turbine runner that is rotatable around an axis extending along an axial direction of the fluid transmission apparatus together with the pump impeller;
    a damper mechanism that includes an input element, an elastic body, an output element, a first elastic body engaged with the input element, a second elastic body engaged with the output element and an intermediate element engaged with the first elastic body and the second elastic body;
    a lock-up clutch mechanism that is able to carry out lockup where the input member is coupled to an input shaft of a transmission via the damper mechanism and that is able to cancel the lockup;
    a dynamic damper that includes an elastic body and a mass body engaged with the elastic body, the elastic body engaged with one of the intermediate element or the output element of the damper mechanism; and
    a centrifugal pendulum vibration absorber that includes a support member and a plurality of mass bodies each oscillatable with respect to the support member, the support member directly connected and engaged with one of the intermediate element or the output element of the damper mechanism,
    wherein the first elastic body of the damper mechanism, the second elastic body of the damper mechanism and the elastic body of the dynamic damper overlap each other with respect to the axial direction of the fluid transmission apparatus when viewed in a radial direction of the fluid transmission apparatus, and are arranged between the turbine runner and the centrifugal pendulum vibration absorber when viewed in the radial direction.

2. The fluid transmission apparatus according to claim 1, wherein
    the damper mechanism includes a first elastic body and a second elastic body, which are arranged apart from each other in the radial direction, as the elastic body, and
    the elastic body of the dynamic damper is arranged between the first elastic body and second elastic body of the damper mechanism when viewed in the axial direction.

3. The fluid transmission apparatus according to claim 1, wherein
    the second elastic body is arranged apart from the first elastic body in the radial direction, and
    the elastic body of the dynamic damper is supported by the intermediate element between the first elastic body and second elastic body of the damper mechanism when viewed in the axial direction.

4. The fluid transmission apparatus according to claim 3, wherein
    the elastic body of the dynamic damper is engaged with the intermediate element of the damper mechanism, and the support member of the centrifugal pendulum vibration absorber is connected to the output element of the damper mechanism.

5. The fluid transmission apparatus according to claim 4, wherein
    the support member of the centrifugal pendulum vibration absorber is fixed to the output element of the damper mechanism on a radially inner side of one of the first and second elastic bodies of the damper mechanism, the one of the first and second elastic bodies being arranged on a radially inner side among the first and second elastic bodies.

6. The fluid transmission apparatus according to claim 2, wherein
the lock-up clutch mechanism includes a lock-up piston that has a portion arranged between the input member and the centrifugal pendulum vibration absorber and that is able to be moved in the axial direction to be frictionally engaged with the input member, and
the fluid transmission apparatus further comprises an elastic body support member that is formed separately from the lock-up piston and is supported around an axis of the fluid transmission apparatus, and that supports one of the first and second elastic bodies of the damper mechanism, the one of the first and second elastic bodies being arranged on a radially most outer side among the first and second elastic bodies.

7. The fluid transmission apparatus according to claim 6, wherein
the elastic body support member is the input element that is formed in an annular shape so as to slidably hold the one of the first and second elastic bodies of the damper mechanism, the one of the first and second elastic bodies being arranged on the radially most outer side among the first and second elastic bodies, and to be engaged with the lock-up piston integrally rotatably about the axis, and the elastic body support member is supported by the turbine runner rotatably about the axis of the fluid transmission apparatus with respect to the turbine runner.

8. The fluid transmission apparatus according to claim 6, wherein
the elastic body support member is an annular member that is formed so as to slidably hold the one of the first and second elastic bodies of the damper mechanism, the one of the first and second elastic bodies being arranged on the radially most outer side among the first and second elastic bodies, and an inner peripheral portion of the elastic body support member is fixed to the turbine runner.

9. The fluid transmission apparatus according to claim 1, wherein
the first elastic body and the second elastic body, are arranged apart from each other in the radial direction, and
the elastic body of the dynamic damper is arranged between the first elastic body and second elastic body of the damper mechanism when viewed in the axial direction.

10. The fluid transmission apparatus according to claim 9, wherein
the elastic body of the dynamic damper is supported by the intermediate element between the first elastic body and second elastic body of the damper mechanism when viewed in the axial direction.

11. The fluid transmission apparatus according to claim 1, wherein one end of the elastic body of the dynamic damper held by the intermediate element is engaged with a corresponding one of a plurality of spring contact portions extending from between axial support portions of the support member that is fixed to an outer peripheral portion of a turbine shell of the turbine runner, and the other ends of the elastic body of the dynamic damper are in contact with a corresponding one of a plurality of spring contact portions formed in the intermediate member of the damper mechanism, therefore the elastic body of the dynamic damper are supported in the circumferential direction of the fluid transmission apparatus when viewed in an axial direction of the fluid transmission apparatus.

12. A fluid transmission apparatus comprising:
a pump impeller that is connected to an input member coupled to a motor;
a turbine runner that is rotatable around an axis extending along an axial direction of the fluid transmission apparatus together with the pump impeller;
a damper mechanism that includes an input element, an elastic body, an output element, a first elastic body engaged with the input element, a second elastic body engaged with the output element and an intermediate element engaged with the first elastic body and the second elastic body;
a lock-up clutch mechanism that is able to carry out lockup where the input member is coupled to an input shaft of a transmission via the damper mechanism and that is able to cancel the lockup;
a dynamic damper that includes an elastic body and a mass body engaged with the elastic body, the elastic body engaged with one of the intermediate element or the output element of the damper mechanism; and
a centrifugal pendulum vibration absorber that includes a support member and a plurality of mass bodies each oscillatable with respect to the support member, the support member engaged with one of the intermediate element or the output element of the damper mechanism,
wherein the centrifugal pendulum is arranged, axially, between the first elastic body and the input member, the input element or a lock-up piston directly connected to the input element and the centrifugal pendulum vibration absorber overlap axially when viewed from a radial direction, and the input element is directly connected to the lock-up piston at an outer side of the centrifugal pendulum vibration absorber.

13. The fluid transmission apparatus according to claim 1, wherein the intermediate element comprises a first intermediate element and a second intermediate element and the elastic body of the dynamic damper is radially supported on one side by the first intermediate element and radially supported on another side by the second intermediate element.

14. The fluid transmission apparatus according to claim 1, wherein the elastic body of the dynamic damper is radially supported by the intermediate element through axially extending portions that extend from the intermediate element in the axial direction.

15. The fluid transmission apparatus according to claim 1, wherein the mass body of the dynamic damper is the turbine runner that is engaged with the elastic body of the dynamic damper.

* * * * *